3,164,423
ARRANGEMENT OF A CONNECTING ROD ON A CRANKSHAFT
Ernst Hatz, Jr., and Karl Heinz Neuer, Ruhstorf, near Passau, and Wilfried Rein, Egiharting, near Munich, Germany, assignors to Motorenfabrik Hatz G.m.b.H., Passau, Germany, a corporation of Germany
Filed May 1, 1963, Ser. No. 277,364
Claims priority, application Germany, May 21, 1962, M 52,934
4 Claims. (Cl. 308—207)

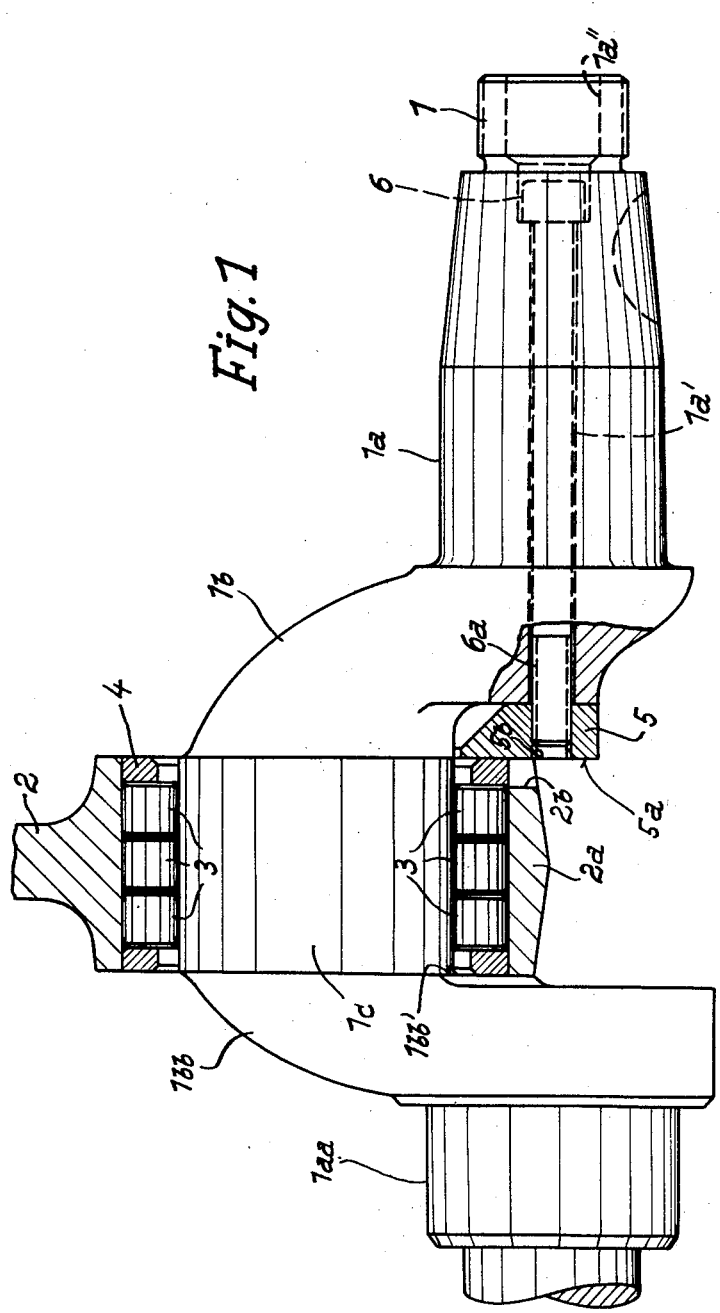

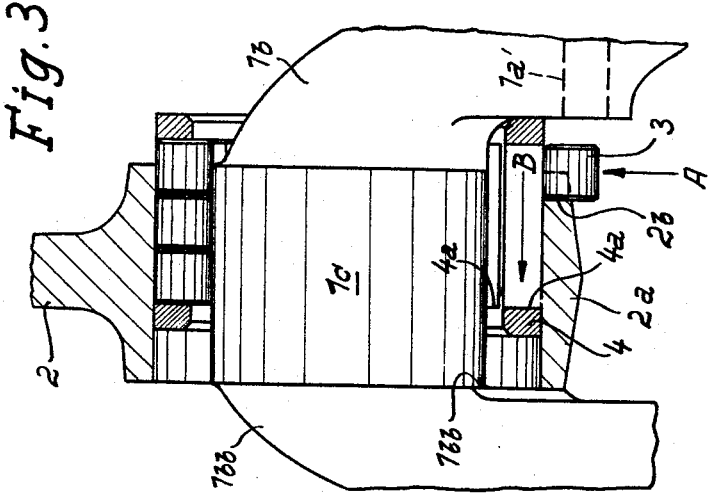
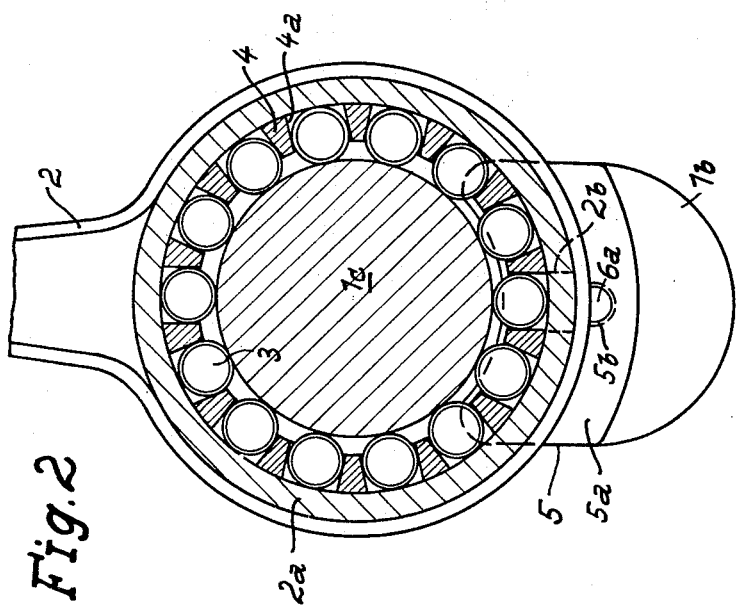

This invention relates to an arrangement of a connecting rod on a crank pin of a crankshaft wherein roller bodies, accommodated in a cage, are interposed between the said rod and the crank pin.

In known arrangements of this type the connecting rod or the crankshaft is frequently composed of two parts which, after they have been assembled and the roller bodies introduced into the cage, are firmly connected by a plurality of screws. These screws, and flanges which receive them, however, greatly enlarge the working circle and path of movement of the connecting rod and the crankshaft. Therefore the dimensions of the crankcase must also be made commensurately large. Such a two-part construction of the components has the additional disadvantage of involving increased fabrication and assembly costs, and an increase in the inertial mass to be displaced.

The primary object of the present invention is to provide an improved arrangement in which both the crankshaft and the connecting rod can each be made in one piece and the roller cage can also consist of a unitary fabrication.

Another aim is to provide such an arrangement which can be installed in a comparatively small space, and produced at low manufacturing costs.

The improved arrangement constituting this invention is characterized in that with the components assembled in their working positions, the big end of the connecting rod and the cage for the roller bodies are applied, for the purpose of lateral guidance at least at one side of the said rod, against a fillet which is of a thickness corresponding approximately to the length of a roller body and is detachably connected to the crankshaft. The crank pin, in axial length, is longer than the actual bearing width by an amount approximately equal to the axial length of one roller body. With the fillet removed, the roller body cage can be moved axially by that amount so that it can be filled with roller bodies. After being filled, the cage is moved back and the fillet inserted.

In accordance with a further and advantageous feature of the invention the fillet may be detachably connected to the inner side of the relevant crank arm of the connecting rod by means of a screw and in such a manner that it partially surrounds the crank pin, the screw being arranged in an axial bore in the journal pin of the crankshaft and engaging in a tapped opening in the fillet. This allows for detachable connection of the fillet to the crankshaft by very simple means.

To provide for easy insertion of roller bodies into the bearing space between the connecting rod, the cage and the crank pin, an opening for such insertion may, according to yet another feature of the invention, be provided in the side of the big end facing the fillet.

In order that the invention may be more clearly understood and readily carried into practical effect, one specific example thereof will now be described with reference to the accompanying drawings, wherein:

FIGURE 1 shows, partly in outside elevation and partly in longitudinal section, a fully assembled crankshaft, connecting rod and bearing arrangement according to this invention, FIGURE 2 is a cross-sectional view of the bearing arrangement taken on the line 11—11 of FIGURE 1, and FIGURE 3 is a view corresponding and similar to the central portion of FIGURE 1 but showing the insertion of roller bodies into the cage during assembly of the arrangement.

Like parts are designated by similar reference characters throughout the drawings.

The invention is illustrated, by way of example, as applied to the crankshaft of a single cylinder internal combustion engine. The one-piece crankshaft 1, of cast steel, has two co-axial journal bearings 1a, 1aa, in the usual way, and two axially spaced and radially offset crank-arms 1b, 1bb which are connected by a crank pin 1c. Mounted upon this crank pin is the closed big end 2a of a one-piece connecting rod 2, also made of cast steel, which in turn is connected to the piston (not shown) of the internal combustion engine. The bearing of the big end 2a upon the crank pin 1c is effected through the medium of interposed roller bodies. In the illustrated example, these bodies consist of cylindrical rollers 3 arranged in three side-by-side circular series each comprising fourteen rollers. The rollers are housed in a unitary cage 4 made of light metal and having fourteen axially extending parallel guide slots 4a (see FIGURES 2 and 3), each adapted to accommodate three side-by-side rollers 3. The case itself is mounted for rotation freely within the bore in the big end 2a of the connecting rod. To make such a bearing arrangement feasible when the aforementioned components are of one-piece construction, the following expedients are adopted in accordance with the present invention.

The axial width of the big end 2a is the same as that of the cage 4. The crank pin 1c is made of a width greater than that which is actually required for supporting the rollers 3, by an amount corresponding to the length of any one of the latter. As illustrated, the right hand crank arm 1b is displaced by this amount, laterally of the crank pin 1c, to enable a flat fillet 5 to be introduced between the said crank arm and the big end 2a, adjacent to the periphery of the crank pin 1c. This fillet has a plane end face 5a which holds the connecting rod 2 and the roller cage 4 against lateral displacement in one axial direction. These components 2 and 4 are held from movement axially in the opposite direction by the lateral guide surface 1bb' of the opposite crank arm 1bb. The inner diameter of the cage 4 and its axial width, on the one hand, and the diameter and curvature of the crank arm 1b on the other hand, are so related to one another that the big end 2a, with an empty cage 4 inserted therein, can be slipped over the crankshaft parts 1a, 1b and on to the crank-pin 1c.

The fillet 5 is detachably secured to the inner side of the crank arm 1b by means of a screw 6 which is arranged in an axial bore 1a' of the crankshaft bearing pin 1a and has a threaded end 6a screwed into a tapped hole 5b in the said fillet. A lateral hole 1a'' in the outer end of the bearing pin 1a provides for the introduction and tightening up on the screw 6 during assembly. The fillet 5 is so formed that it will engage in horseshoe fashion around the crank pin 1c and is thereby prevented from undesirable rocking movement. The fillet may, if desired, be extended radially outwards and thereby increased in weight so that it also acts as a counterweight on the crankshaft.

Additionally, it will be noted that a filling opening 2b is provided in the lateral bounding face of the big end 2a facing the fillet 5, the axial dimension of this opening being slightly larger than the axial length of the collar of the roller cage 4. The width of the filling opening 2b, apparent in FIGURE 2, is a little in excess of the diameter of the individual rollers 3.

The steps of assembling the connecting rod upon the crankshaft are as follows:

The big end 2a, with an empty cage 4 inserted therein, is first slipped over the crankshaft parts 1a, 1b and on to the crank pin 1c. The big end 2a is then held against the lateral guide face 1bb' of the left hand crank arm 1bb, while the cage 4 is shifted to the right within the bore in the big end and towards the crank arm 1b, as clearly seen in FIGURE 3. A passageway is thereby provided between the right hand bounding edge of a relevant cage slot 4a and the left hand bounding edge of the filling opening 2b, and the three rollers for each guide slot in the case are introduced individually and in succession through this passage. Each roller is, in fact, first introduced radially in the direction of the arrow A (FIGURE 3) and is then, if necessary, moved axially to the left in the direction of the arrow B, until it has reached its working position. After three rollers 3 have been inserted in any one slot 4a the case 4 is thereupon turned through an angular extent corresponding to one partition so as to bring the next empty slot 4a into the required position opposite to the filling opening 2b for the introduction thereinto of the next three rollers. This filling operation is repeated fourteen times, in the specific example now being described, until all the slots 4a have been filled—each by a set of three rollers 3. Thereafter the filled cage 4 is shifted back leftwards from the position illustrated in FIGURE 3 into that depicted in FIGURE 1 and is retained in this working position by the introduction and tightening up of the fillet 5. This completes the mounting of the components 1 and 2—with the roller bodies 3 accommodated in the cage 4 in position between them.

The arrangement according to the invention provides many advantages. In the first place it enables the components to be made as one-piece members, and this reduces the manufacturing costs. Moreover, the lightweight construction of the component parts improves the performance of the internal combustion engine. In addition the assembly is simple and can be performed quickly without necessitating auxiliary tools. Thus, the improved arrangement is a rational and economic one. The outer diameter of the big end and the throw of the crankshaft can, by virtue of the omission of the clamping screws which have hitherto been used on the connecting rod and the crankshaft, be made substantially smaller and this in turn results in a more compact construction of the crank case and consequently of the engine itself.

Finally, it is to be clearly understood that the construction herein specifically described represents only one of the potential forms of the improved arrangement according to the present invention. Thus, for example, the invention may be employed with equal advantage in connection with a one-piece crankshaft provided with more than one crank-pin. Moreover, if need be, a fillet of the character herein described can be provided at each side of the big end of each connecting rod.

What we claim is:

1. The combination comprising a unitary crankshaft having at least one radially offset crankpin, a unitary connecting rod journalled at its big end to said crankpin, said big end having an internal cylindrical bearing surface and having roller bodies fitted in a unitary cage movably disposed in said internal cylindrical bearing surface, said unitary cage comprising a unitary tube having a collar at either end and slots disposed between said collars to retain said roller bodies, said unitary cage further having an axial length substantially corresponding to the axial length of said big end, each crankpin being axially longer than the axial length of cylindrical bearing surface by a distance approximately equal to the axial length of one of said roller bodies, and at least one fillet having a thickness substantially equal to the length of one of said roller bodies and being detachably connected to said crankshaft bearing against and holding in position the cage and the big end of the connecting rod on said crankpin of the crankshaft.

2. The combination according to claim 1 wherein said big end of the connecting rod has a radial slot at one of its edges communicating with said internal bearing surface, said slot being substantially equal in an axial direction to the width of said collar and being substantially equal in circumferential width to the diameter of a roller body.

3. The combination as set forth in claim 2 wherein said fillet is aligned with the main longitudinal axis of said crankshaft, further comprising a longitudinally extending passage formed in said crankshaft substantially along the longitudinal axis thereof, and a screwthreaded member in said longitudinal passage for detachably holding said fillet in position so as to maintain said cage and said big end in position and so as to be removable to permit said cage to be displaced longitudinally for a distance sufficient to clear said slot for insertion or removal of said roller bodies.

4. A combination comprising a unitary crank having at least one radially offset crankpin section having a cylindrical bearing surface, a connecting rod journalled to said bearing surface by means of roller bodies disposed in a cage removably fitted within an internal bearing surface in said connecting rod, said cage comprising a unitary tubular member having collars at either end and axial slots, each slot containing a plurality of roller bodies, the diameter of said roller bodies being appreciably greater than the wall thickness of said tubular cage, said crankpin section being longer in axial direction than the axial length of said connecting rod by a distance substantially equal to the length of one of said roller bodies so as to permit axial movement of said cage, a slot in an edge of said connecting rod communicating with said internal bearing surface, said slot in an edge of said connecting rod being of a size permitting one of said roller bodies to be inserted therethrough when said cage is shifted axially and being substantially covered by one of said collars when said cage is in its normal position, and at least one fillet detachably connected by screw means to said crankshaft and disposed between said crankshaft and said connecting rod to hold said connecting rod and said cage in position over said cylindrical bearing surface of said crankpin section.

References Cited by the Examiner

UNITED STATES PATENTS

| | | | |
|---|---|---|---|
| 1,383,292 | 7/21 | Douglas | 308—179 |
| 1,479,324 | 1/24 | Schneider | 308—179 |
| 1,963,407 | 6/34 | Herrmann | 308—217 |
| 2,248,615 | 7/41 | Frauenthal | 308—207 |
| 2,695,204 | 11/54 | Matera | 308—179 |

FOREIGN PATENTS

| | | |
|---|---|---|
| 611,419 | 7/26 | France. |
| 122,559 | 1/19 | Great Britain. |

FRANK SUSKO, *Primary Examiner.*

ROBERT C. RIORDON, *Examiner.*

UNITED STATES PATENT OFFICE
CERTIFICATE OF CORRECTION

Patent No. 3,164,423                        January 5, 1965

Ernst Hatz, Jr., et al.

It is hereby certified that error appears in the above numbered patent requiring correction and that the said Letters Patent should read as corrected below.

In the grant, line 4, for "of Passau, Germany," read -- of Ruhstorf, near Passau, Germany, --; in the heading to the printed specification, line 7, for "Passau, Germany," read -- Ruhstorf, near Passau, Germany, --.

Signed and sealed this 29th day of June 1965.

(SEAL)
Attest:

ERNEST W. SWIDER
Attesting Officer

EDWARD J. BRENNER
Commissioner of Patents